United States Patent
Pawluski

(10) Patent No.: US 12,523,010 B2
(45) Date of Patent: Jan. 13, 2026

(54) SYSTEM, APPARATUS, AND METHOD FOR REMOTE CONTROL OF A WORK VEHICLE

(71) Applicant: Vincent Edmund Pawluski, County of Grande Prairie No. 1 (CA)

(72) Inventor: Vincent Edmund Pawluski, County of Grande Prairie No. 1 (CA)

(73) Assignee: Pawluski Patents Corporation, The Woodlands, TX (US)

( * ) Notice: Subject to any disclaimer, the term of this patent is extended or adjusted under 35 U.S.C. 154(b) by 39 days.

(21) Appl. No.: 18/255,022

(22) PCT Filed: Nov. 29, 2021

(86) PCT No.: PCT/CA2021/051700
§ 371 (c)(1),
(2) Date: May 30, 2023

(87) PCT Pub. No.: WO2022/109750
PCT Pub. Date: Jun. 2, 2022

(65) Prior Publication Data
US 2024/0044106 A1    Feb. 8, 2024

Related U.S. Application Data

(60) Provisional application No. 63/119,076, filed on Nov. 30, 2020.

(51) Int. Cl.
*E02F 9/20* (2006.01)
*G05G 1/02* (2006.01)
*G05G 7/10* (2006.01)

(52) U.S. Cl.
CPC ............ *E02F 9/2004* (2013.01); *E02F 9/205* (2013.01); *G05G 1/02* (2013.01); *G05G 7/10* (2013.01)

(58) Field of Classification Search
CPC .......... E02F 9/2004; E02F 9/205; G05G 1/02; G05G 7/10; B60T 7/16; B60K 2360/162;
(Continued)

(56) References Cited

U.S. PATENT DOCUMENTS

| | | |
|---|---|---|
| 5,835,867 A | 11/1998 | Froelich et al. |
| 6,112,139 A | 8/2000 | Schubert et al. |

(Continued)

FOREIGN PATENT DOCUMENTS

| | | |
|---|---|---|
| CN | 106759619 A | 5/2017 |
| CN | 111899628 A | 11/2020 |
| DE | 10 2019 000794 A1 | 8/2020 |

OTHER PUBLICATIONS

International Search Report and Written Opinion in International Application No. PCT/CA2021/051700, dated Feb. 1, 2022, 6 pages.

(Continued)

*Primary Examiner* — Richard M Camby
(74) *Attorney, Agent, or Firm* — Thomas J. Oppold; Larkin Hoffman Daly & Lindgren, Ltd.

(57) ABSTRACT

A control apparatus for operationally engaging a vehicle having one or more manually operable control elements. Each of the one or more manually operable control elements has a mechanical operator-interface. The control apparatus has one or more control actuators each for mechanically engaging the mechanical operator-interface of a corresponding one of the one or more manually operable control elements, a signal receiver for receiving command signals from a remote control, and a control circuit module functionally coupled to the signal receiver and the one or more control actuators for controlling the operation of the one or more control actuators based on the received command signals, to control the operation of the vehicle.

12 Claims, 9 Drawing Sheets

(58) Field of Classification Search
CPC .................. B60K 2360/55; B60K 2360/61;
B60K 35/10; B60K 35/21; B62D 1/00
See application file for complete search history.

(56) References Cited

U.S. PATENT DOCUMENTS

| | | | |
|---|---|---|---|
| 7,140,830 B2* | 11/2006 | Berger | E02F 9/24 |
| | | | 414/699 |
| 8,615,334 B2 | 12/2013 | Ewert | |
| 10,572,141 B2* | 2/2020 | Foster | G05D 1/0278 |
| 2004/0136821 A1* | 7/2004 | Berger | E02F 3/433 |
| | | | 414/699 |
| 2010/0106344 A1* | 4/2010 | Edwards | G05D 1/0274 |
| | | | 701/2 |
| 2015/0319913 A1* | 11/2015 | Foster | A01B 69/00 |
| | | | 701/26 |
| 2015/0366124 A1* | 12/2015 | Kremmer | A01B 63/1006 |
| | | | 701/2 |
| 2021/0071388 A1 | 3/2021 | Yamazaki et al. | |

OTHER PUBLICATIONS

European Search Report in European Application No. 21896020.1, dated Nov. 13, 2024, 9 pages.

* cited by examiner

SYSTEM, APPARATUS, AND METHOD FOR REMOTE CONTROL OF A WORK VEHICLE

CROSS-REFERENCE TO RELATED APPLICATIONS

This application claims the benefit of U.S. Provisional Patent Application Ser. No. 63/119,076, filed Nov. 30, 2020, the content of which is incorporated herein by reference in its entirety.

FIELD OF THE DISCLOSURE

The present disclosure relates generally to a system, apparatus, and method for remotely controlling a work vehicle, and in particular to a system, apparatus, and method for operationally engaging a work vehicle for remotely controlling one or more manually controllable output elements thereof.

BACKGROUND

Many types of work vehicles, for example agricultural tractors, construction vehicles, and the like, comprise one or more output elements such as power take-off (PTO) shafts or hydraulic circuits that may be used to drive one or more features of an implement coupled thereto. These output elements are typically manually controllable and may be operated by an operator via manually operable elements such as control switches within an operator cab of the work vehicle. While in many instances, the operator may prefer to be situated externally of the vehicle to monitor operation of the implement; the operator may have to stay in the cab to operate the vehicle or may have to repeatedly enter the cab to change the operational state of the output elements.

U.S. Pat. No. 6,112,139 to Schubert et al. teaches an apparatus and method for wireless remote control of an output element coupled to a work vehicle. The output element performs work external to the vehicle and is actuated by an actuator controlled by an output controller in response to at least a remote control signal. The apparatus includes a wireless remote transmitter movable with respect to the vehicle and a wireless receiver supported by the vehicle. The transmitter has an actuatable input device for generating a command signal, a transmitter antenna, and a transmitter control circuit which receives the command signal from the input device, generates the remote control signal in response to the command signal, and applies the remote control signal to the transmitter antenna for wireless transmission to the work vehicle. The receiver includes a receiver antenna and a receiver control circuit which receives the remote control signal from the receiver antenna after transmission by the transmitter, and applies the remote control signal to the output controller.

Many work vehicles include forms of output elements, for example hydraulic circuits in many instances, having control circuits that are not actuated through a common electronic circuitry of the vehicle so that the apparatus as described in U.S. Pat. No. 6,112,139 is not compatible with these types of output elements. Furthermore, the wired connection of the apparatus to the electronic circuitry of the work vehicle may require specialized knowledge resulting in time consuming and costly installation.

SUMMARY

According to one aspect of this disclosure, there is provided a control apparatus for operationally engaging a vehicle having one or more manually operable control elements, each of the one or more manually operable control elements having a mechanical operator-interface, the control apparatus comprising: one or more control actuators each for mechanically engaging the mechanical operator-interface of a corresponding one of the one or more manually operable control elements; a signal receiver for receiving command signals from a remote control; and a control circuit module functionally coupled to the signal receiver and the one or more control actuators for controlling the operation of the one or more control actuators based on the received command signals, to control the operation of the vehicle.

In some embodiments, the signal receiver is a signal transceiver.

In some embodiments, the signal receiver is a wireless signal receiver.

In some embodiments, the control apparatus further comprises: at least one frame for coupling to a supporting structure of the one or more manually operable control elements and for supporting one or more of the one or more control actuators, the signal receiver, and the control circuit module.

In some embodiments, the at least one frame is releasably coupled to an armrest and/or one or more control consoles in an operator cab of the vehicle.

In some embodiments, the control apparatus further comprises: a signaling component for indicating the operation status of the vehicle.

In some embodiments, the signaling component comprises an indicator light for coupling to the vehicle at a position visible from outside of the vehicle.

In some embodiments, the one or more control actuators comprises at least one of: one or more power take-off (PTO) control actuators each for engaging the mechanical operator-interface of a corresponding PTO control element for controlling the operation of a PTO shaft of the vehicle; one or more rotary-speed control actuators each for engaging the mechanical operator-interface of a corresponding rotary-speed control elements for controlling the rotary speed of the PTO shaft; one or more hydraulic control actuators each for engaging the mechanical operator-interface of a corresponding hydraulic control element for controlling the operation of a hydraulic circuit of the vehicle; one or more joystick actuators each for engaging a corresponding joystick or lever of the vehicle; a steering-wheel actuator for engaging a steering wheel of the vehicle; a start-switch actuator for mechanically engaging a handle portion of an operator key inserted in a start switch of the vehicle for actuating the operator key and subsequently the start switch to start or stop an engine of the vehicle; and one or more speed control elements each for engaging the mechanical operator-interface of a corresponding speed control element for controlling the speed of the engine of the vehicle.

In some embodiments, the engine comprises at least one of an internal combustion engine and a motor.

In some embodiments, at least one of the one or more hydraulic control actuators is configured for engaging the mechanical operator-interface of the corresponding hydraulic control switch for controlling the operation of at least one hydraulic valve of the vehicle.

In some embodiments, the start-switch actuator comprises: a start-switch actuator frame for coupling to a supporting structure of the start switch; a wheel rotatably coupled to the start-switch actuator frame, the wheel comprising a recess for receiving the handle portion of the operator key inserted in the start switch; and an actuator assembly coupled to the wheel for rotating the wheel and subsequently the operator key to start or stop the engine.

In some embodiments, the actuator assembly comprises a single actuator coupled to the wheel via a crank arm.

In some embodiments, the actuator assembly comprises: a movable base; a first actuator coupling the wheel to the base; and a second actuator coupling the base to a fixed point.

In some embodiments, one of the first and second actuators is for rotating the wheel and subsequently the operator key between an OFF position and an ON position of the start switch, and another one of the first and second actuators is for rotating the wheel and subsequently the operator key between the ON position and a START position of the start switch.

In some embodiments, the first actuator is configured for rotating the wheel, and the second actuator is configured for rotating the base.

In some embodiments, the start-switch actuator further comprises a linearly movable gear rack; the wheel is a gear engaging the gear rack; the first actuator couples the gear rack to the base for linearly moving the gear rack with respect to the base; and the second actuator is configured for linearly moving the base.

In some embodiments, the start-switch actuator further comprises one or more delimiters for delimiting the rotation range of the wheel.

In some embodiments, the steering-wheel actuator comprises a driving wheel and one or more driven wheels configured for engaging and sandwiching the steering wheel between the driving wheel and the one or more driven wheels.

In some embodiments, at least one of the one or more control actuators is coupled to a supporting structure; and the supporting structure comprises: a base structure having an interface for coupling to the actuator, the interface comprising a longitudinal bore and a laterally extending recess intersecting the bore, a dial wheel received in the recess, the dial wheel comprising a bore and threads on the inner surface thereof, and a threaded rod extending from the at least one of the one or more control actuators through the bore of the interface and the bore of the dial wheel such that the threads of the threaded rod engage those of the dial wheel.

In some embodiments, the threaded rod is pivotably extending from the at least one of the one or more control actuators.

In some embodiments, the control apparatus further comprises: a first emergency stop button for commanding the one or more control actuators to actuate the one or more manually operable control elements to OFF states to stop the operation of the vehicle.

In some embodiments, the control apparatus further comprises: a power adapter plug insertable into a power socket of the vehicle for powering at least a first subset of the one or more control actuators, the signal receiver, and control circuit module.

In some embodiments, the control apparatus further comprises: a battery module for powering at least a second subset of the one or more control actuators, the signal receiver, and control circuit module.

In some embodiments, the battery module is configured for powering the second subset only when the power adapter plug fails to output power; and the control circuit module is configured for commanding the one or more control actuators to stop the operation of the vehicle when the battery module is powering the second subset.

In some embodiments, the control circuit module is configured for commanding the one or more control actuators to stop the operation of the vehicle after a predefined time duration from receiving a timed shutoff command signal from the remote control.

In some embodiments, the remote control comprises an engine button; a first depress of the engine button is configured for triggering the remote control to send a first signal to the control circuit module for commanding the start-switch actuator to actuate the operator key to an ON position; and a second depress and hold of the engine button is configured for triggering the remote control to send a first signal to the control circuit module for commanding the start-switch actuator to actuate the operator key to a START position until the engine button is released.

In some embodiments, the remote control comprises a second emergency stop button.

In some embodiments, the remote control comprises a key slot for removably receiving a security key for enabling the remote control; and the remote control is disabled when the security key is removed from the key slot.

In some embodiments, the remote control comprises an unlock button for enabling one or more buttons of the remote control.

In some embodiments, the unlock button is configured for enabling the one or more buttons of the remote control for a predefined period of time or until any of the one or more buttons is depressed or while the unlock button is depressed.

BRIEF DESCRIPTION OF THE DRAWINGS

For a more complete understanding of the disclosure, reference is made to the following description and accompanying drawings, in which:

FIGS. 4A to 4D show a start-switch frame assembly of the add-on control apparatus of the work vehicle shown in FIG. 1, according to some embodiments of this disclosure, wherein FIGS. 4A and 4B are perspective views of the start-switch frame assembly from different viewing angles, FIG. 4C is a front view of the start-switch frame assembly shown in FIG. 4A, and FIG. 4D is a rear view of the start-switch frame assembly shown in FIG. 4A;

FIGS. 9A and 8B are perspective views of an add-on control apparatus of the work vehicle shown in FIG. 1 from different viewing angles, according to some embodiments of this disclosure;

DETAILED DESCRIPTION

Figure 1:
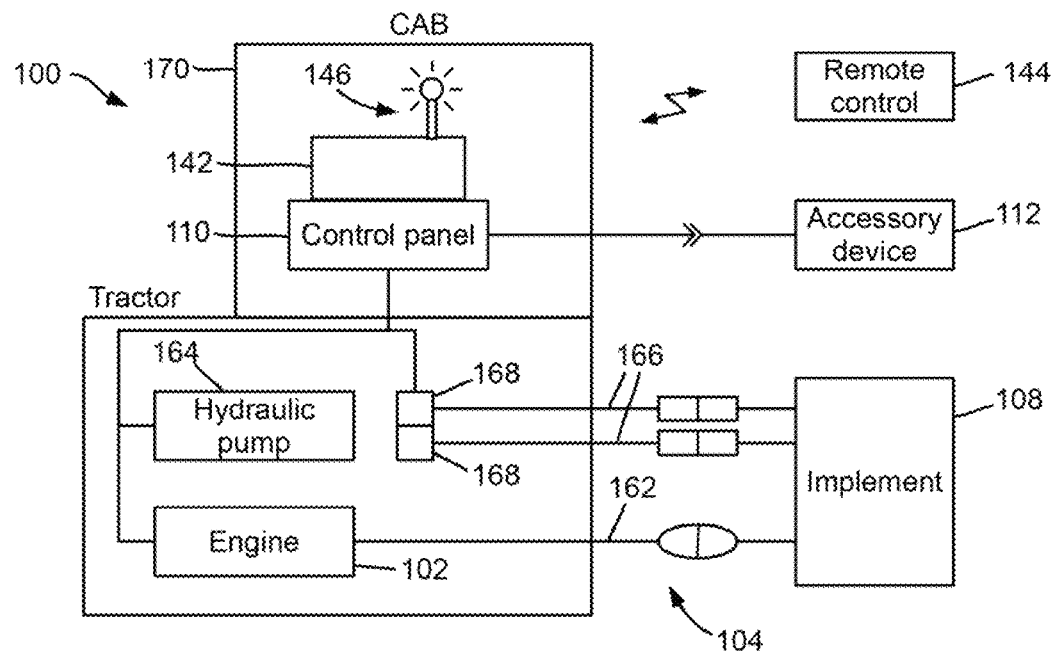
FIG. 1 is a schematic diagram of a work vehicle, according to some embodiments of this disclosure, the work vehicle comprising one or more add-on control apparatuses for overriding the manual operation of the work vehicle and enabling remote control thereof from a remote-control device.

Turning now to FIG. 1, a work vehicle according to some embodiments of this disclosure is shown and is generally identified using reference numeral 100. In these embodiments, the work vehicle may be an agricultural tractor, a construction vehicle, or the like. The work vehicle 100 comprises a power source 102 for powering and driving a plurality of output elements 104 (described later) for operating the work vehicle 100 and one or more implements 108 thereof such as one or more agricultural conveyors, forks, harrows, plows, and/or the like. As those skilled in the art will appreciate, the power source 102 may be any suitable source for providing power to various parts of the work vehicle 100. For example, the power source 102 in various embodiments may be an internal combustion engine (for example, a diesel engine, a gas engine, or the like), an electrical motor, and/or the like.

The output elements 104 may comprise a power take-off (PTO) shaft 162 having a rotary output drivable by the engine 102 for operating the implements 108. The output elements 104 may also comprise a hydraulic system such as a hydraulic pump 164 drivable by the engine 102 for producing a supply of pressurized hydraulic fluid for actuating one or more implements 108 via one or more hydraulic circuits 166. The hydraulic circuits 166 may comprise one or more hydraulic valves 168 for controlling the flow of the pressurized hydraulic fluid to control the operation of the implements 108.

The work vehicle 100 also comprises a control panel assembly 110 usually supported within the operator cab 170 of the work vehicle 100. The control panel assembly 110 comprises one or more manually operable control elements 182 (see FIG. 3) functionally coupled to the power source 102 and the output elements 104 (collectively denoted "operable elements" hereinafter) for controlling the operation of the work vehicle 100, the implements 108, and one or more accessary devices 112 via various operable elements 102 and 104. Examples of the accessory devices 112 may be interior and exterior lights, linear actuator, rotary actuator, electric valve, hydraulic valve, solenoid valve, pneumatic valve, and the like.

For example, the control panel assembly 110 usually comprises a manually operable start switch mounted on a start switch panel. The start switch accepts an operator key to allow rotation between an OFF position, an ACCESSORY position, an ON position, and a START position. When an operator turns the operator key to displace the start switch from the OFF position to the ACCESSORY position, the accessory devices of the work vehicle 100 are turned on. When the operator further turns the operator key to the ON position, all electronic circuits of the work vehicle 100 are activated. When the operator bias the start switch from the ON position to the START position, a starter motor of the work vehicle 100 is activated to start the engine 102. After ignition of the engine 102, the operator may release the operator key and the start switch returns to the ON position to maintain the work vehicle 100 in the operable state.

The control panel assembly 110 may also comprise an armrest panel extending alongside the operator seat (not shown) and/or a control console. The armrest panel comprises a plurality of manually operable control elements such as one or more joysticks or levers, one or more control switches, and/or the like. The control switches may be in the form of push buttons which may be depressed or pushed to activate or deactivate, two-way toggle buttons which may be deflected between two opposing positions (such as ON and OFF positions), three-way toggle buttons which may be deflected to opposing positions from a central neutral position (for example, forward and reverse actuating positions), various forms of dials or sliders tunable to various positions for adjusting input values or parameters, and/or the like.

Figure 2:
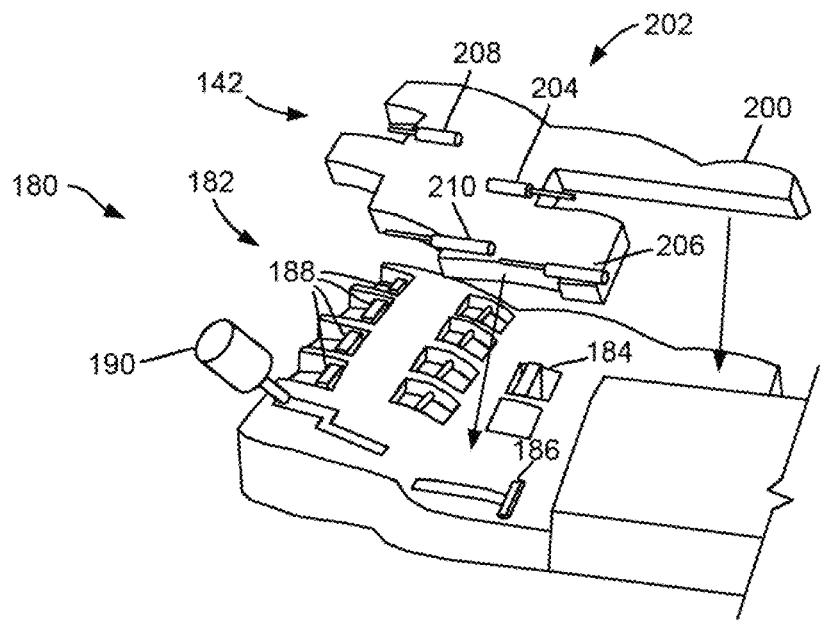
FIG. 2 is a schematic perspective view of a portion of an armrest panel of the work vehicle shown in FIG. 1.

FIG. 2 shows an example of an armrest panel 180 which comprises a plurality of manually operable control elements 182 in various forms such as one or more PTO control elements 184 (for example, in the form of PTO switches), one or more rotary-speed (or rotations per minute (RPMs)) control elements 186, one or more hydraulic control elements 188 (for example, in the form of hydraulic control switches), and one or more joysticks or levers 190.

The PTO switch 184 is used for activating and deactivating the PTO shaft 162. In this example, the PTO switch 184 is a toggle switch displaceable between an ON position and an OFF position to activate and deactivate the PTO shaft 162 respectively. However, those skilled in the art will appreciate that, in some instances, the PTO switch 184 may be a single button for toggling the PTO shaft 162 ON and OFF (that is, turning the PTO shaft 162 ON if the PTO shaft 162 is currently OFF or turning the PTO shaft 162 OFF if it is currently ON). In other instances, the PTO switch 184 may comprise separate ON and OFF buttons for activating and deactivating the PTO shaft 162 respectively when depressed by the operator.

The RPM control element 186 is used for controlling the RPM of the PTO shaft 162 which typically operates at an idling level of RPMs until further actuated by the operator. The RPM control element 186 in this instance may comprise a dial or slider tunable to generate appropriate control signals for the engine controller of the work vehicle 100 to change the operating RPM value. In other instances, the RPM control element 186 may comprise one or more buttons depressible by the operator to change the operating RPM value from the idling level to a predefined and/or programmable level associated with that button.

The hydraulic control switches 188 are used for controlling the hydraulic valves 168. In some instances, a hydraulic valve 168 may be associated with and functionally coupled to a single hydraulic switch 188 in the form of a two-way toggle switch displaceable from a neutral position in opposing directions towards opposing forward and reverse positions for controlling the hydraulic fluid in the respective hydraulic circuit 166 to be idle/neutral, or flow in either one of opposing forward and reverse directions. Alternatively, a hydraulic valve 168 may be associated with and functionally coupled to a pair of hydraulic control buttons 188 such that depressing one of the buttons 188 may actuate flow in the respective hydraulic circuit 166 in a forward direction, and depressing the other button may actuate flow in the respective hydraulic circuit 166 in a reverse direction.

The joysticks or levers 190 are used for controlling the movement of the work vehicle 100 and/or the implements 108 thereof.

As shown in FIG. 2, each manually operable control element 182 generally comprises a mechanical operator-interface such as a switch handle, a slider handle, a dial body, a joystick or lever, and/or the like, to be held by an operator for manually operating the control element 182.

Referring again to FIG. 1, in these embodiments, one or more add-on control apparatuses 142 are coupled to the control panel assembly 110 such as the armrest panel 180 and/or a control console. Each add-on control apparatus 142 comprises one or more control actuators mechanically engaging the mechanical operator-interface of a corresponding control element 182 to "override" the manual operation thereof and enable remote control thereof from a remote-control device 144. In these embodiments, at least one add-on control apparatus 142 may also comprise a signaling component such as one or more indicator lights 146 visible from outside of the work vehicle 100 for indicating the operation status of the work vehicle 100.

For example, FIG. 2 shows an add-on control apparatus 142 coupled to the armrest panel 180. The add-on control apparatus 142 comprises an armrest frame 200 supporting a plurality of control actuators 202 (such as linear actuators, rotary actuators, and/or the like) thereon to override the manual operation of the control elements 182 of the armrest panel 180 and enable remote control thereof (described in more detail later). For example, the control actuators 202 of the add-on control apparatus 142 may comprise one or more PTO control actuators 204 for engaging and actuating the one or more PTO switches 184, one or more RPM control actuators 206 for engaging and actuating the one or more RPM control elements 186, one or more hydraulic control actuators 208 for engaging and actuating the hydraulic control switches 188, and one or more joystick actuators 210 for actuating the joysticks or levers 190.

Figure 3:
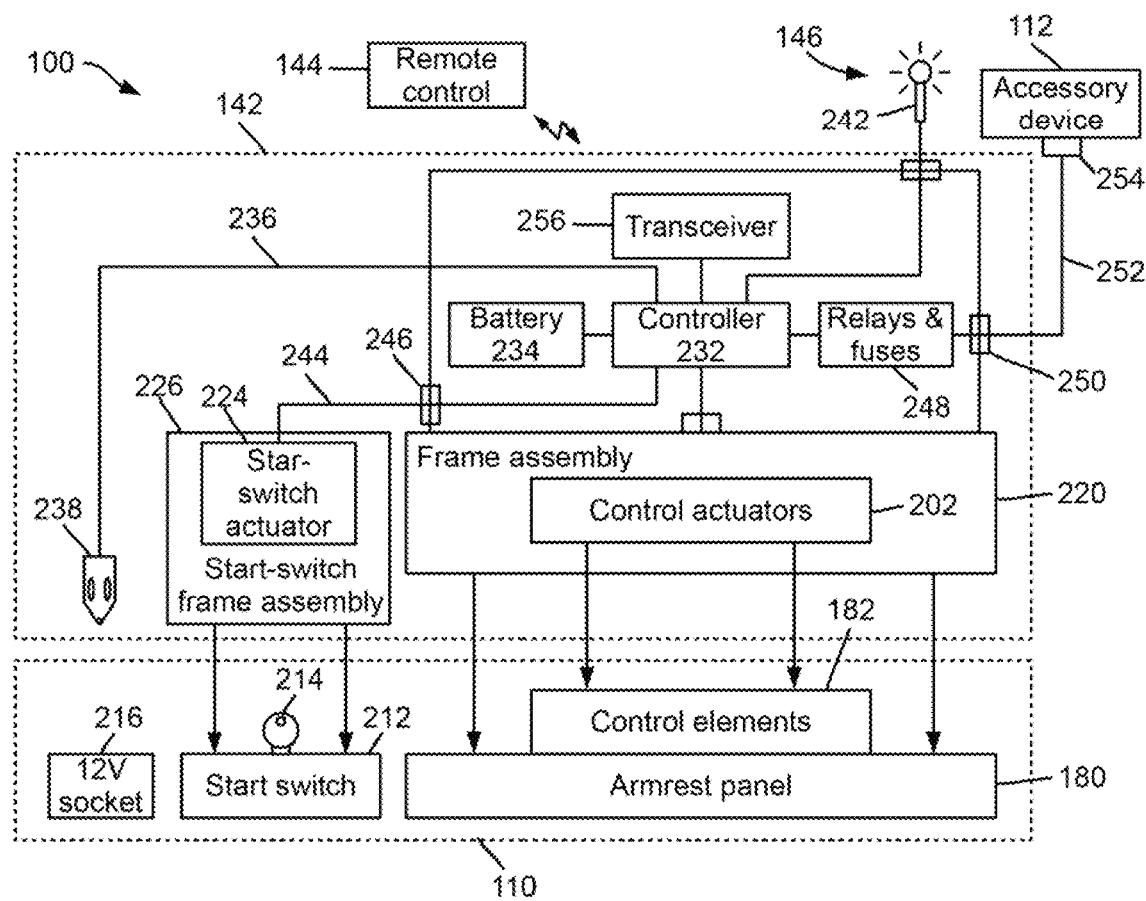
FIG. 3 is a schematic diagram showing the functional structure of the work vehicle shown in FIG. 1.
Figure 4A:
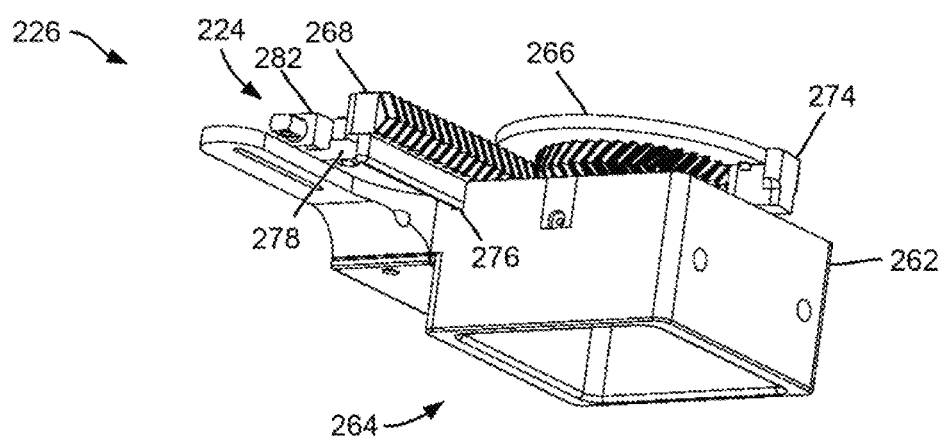
Figure 4B:
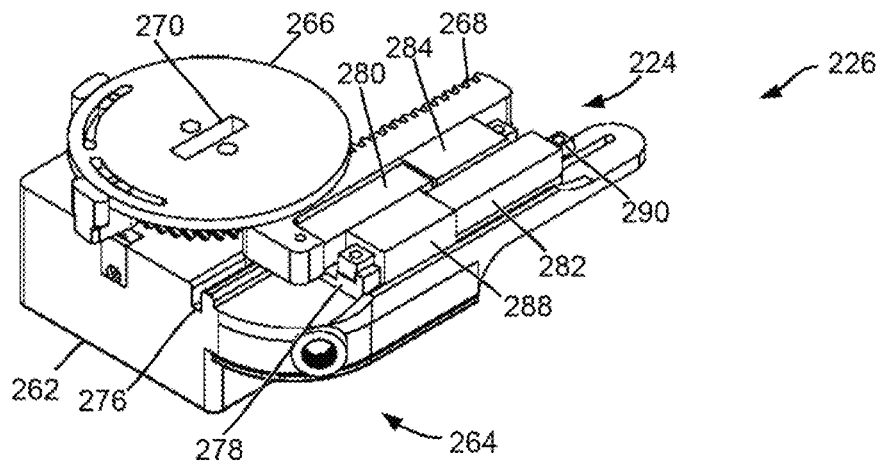
Figure 4C:
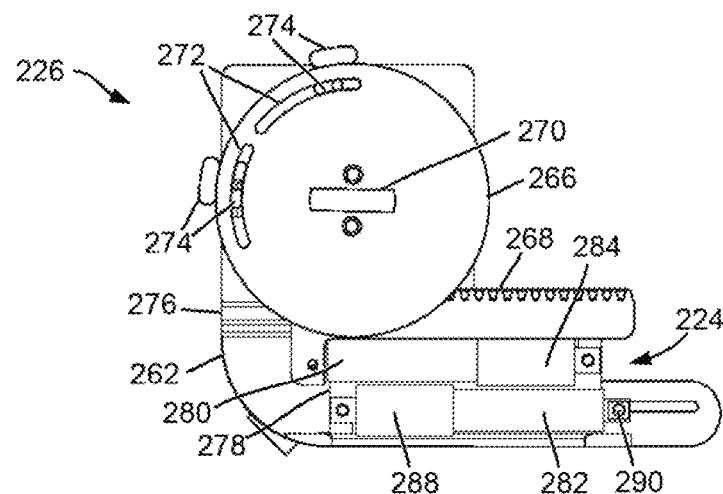
Figure 4D:
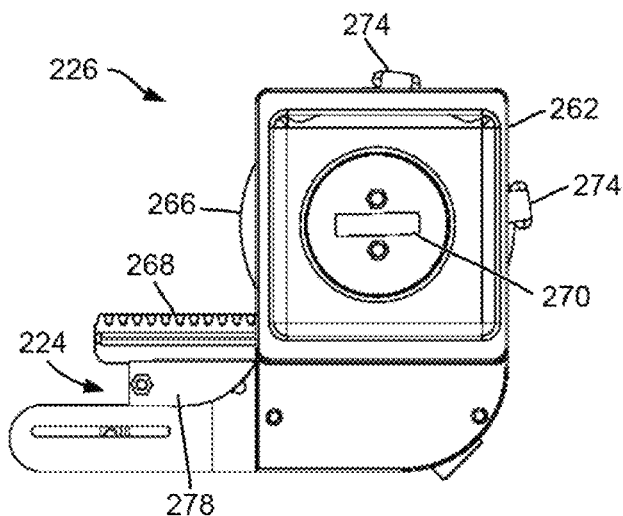

FIG. 3 is a schematic diagram showing the functional structure of the work vehicle 100. As described above, the control panel assembly 110 comprises the armrest panel 180 having various control elements 182 and a start switch 212 (which is also considered a control element herein after) for receiving the teeth portion of an operator key 214 to allow an operator to hold and turn the handle portion of the operator key 214 to start the engine 102. The control panel assembly 110 also comprises one or more electrical sockets 216 such as one or more 12V sockets.

In these embodiments, the add-on control apparatus 142 comprises a main frame assembly 220 and a start-switch frame assembly 226. The start-switch frame assembly 226 comprises a rigid body in the form of a rigid frame or rigid enclosure for coupling to the start switch 212 and receiving thereon or therein the start-switch actuator 224 functionally coupled to the main frame assembly 220 for actuating the start switch 212 under the commands from the main frame assembly 220.

Similarly, the main frame assembly 220 comprises a rigid body in the form of a rigid frame or rigid enclosure for receiving thereon or therein the control actuators 202, a controller or control circuit module 232, a battery module 234, a relay-and-fuse module 248 having one or more relays and fuses, a transceiver 256, indicator lights 146, and other components as needed (not shown). The body may be, for example, a single molded body of continuous, seamless, integrally molded plastic material and comprise the interface shaped and sized to mate in close relationship to the contours of at least a portion of the control panel assembly 110 for coupling thereto. The main frame assembly 220 may be demountably coupled to the control panel assembly 110 using suitable means such as straps with releasable fasteners, screws, nails, and/or the like for securing the main frame assembly 220 to the control panel assembly 110 in fixed relationship thereto.

The control circuit module 232 generally comprises a circuit board, a central processor, and a memory (not shown). Programming instructions are stored in the memory and may be executed by the processor for executing the various functions described herein for operating the add-on control apparatus 142.

The battery module 234 comprises one or more batteries for outputting electrical power at a predefined voltage such as 12 volts (V). The battery module 234 cooperates with a diode so that it can be charged by the electrical system of the work vehicle 100 but the diode does not allow electrical power to feed back to the electrical system of the work vehicle 100.

The battery module 234 is coupled to one or more of the control circuit module 232, transceiver 256, the control actuators 202, and other electrical components for providing electrical power thereto. The control circuit module 232 may also be connected to an external 12 V adapter plug 238 via a flexible lead or wire 236 such that the control circuit module 232 may be powered by the external electrical power supply of the work vehicle 100 when the adapter plug 238 is inserted into the power socket 216 of the control panel assembly 110. Similarly, other electrical components may also be connected to the power socket 216. For example, the transceiver 256 may be connected to the power socket 216 for powering and the battery module 234 may also be connected to the power socket 216 for charging. Thus, the battery module 234 may be used as a backup electrical power for the control circuit module 232 in the event when the adapter plug 238 is removed from the socket 216 or when the socket 216 of the work vehicle 100 fails.

For example, in the event of a loss of external power to the control circuit module 232 from the work vehicle 100, the battery module 234 provides sufficient power to enable all of the various control elements 182 and 212 of the work vehicle 100 to be actuated in an appropriate manner to cease operation of the corresponding operable elements 102 and 104. Furthermore, the control circuit module 232 may be programmed to automatically respond to detection of a loss of power from the adapter plug 238 connected to the work vehicle 100 and automatically actuate all control actuators 202 and 224 to their home safe positions to deactivate the operable elements 102 and 104. This includes ceasing operation of the PTO shaft 162 and/or returning one or more hydraulic circuits 166 to respective neutral positions.

The indicator lights 146 is preferably installed or otherwise positioned at a position highly visible from the exterior of the operator cab 170 in substantially all directions about the perimeter of the work vehicle 100. In some embodiments, the indicator lights 146 comprises a mast 242 in the form of a rigid pole. In some embodiments, the mast 242 may be a telescopic pole or may be foldable.

The transceiver 256 is configured for wirelessly communicating with the remote control 144 for receiving user instructions therefrom and/or for reporting statuses of various elements of the work vehicle 100 thereto. In embodiments wherein the control circuit module 232 does not have the functionality of reporting statuses to the remote control 144, the transceiver 256 may be a signal receiver only capable of receiving command signals from the remote control 144. Preferably, the transceiver or signal receiver 256 is a wireless transceiver or wireless signal receiver. However, those skilled in the art will appreciate that, in some alternative embodiments, the transceiver or signal receiver 256 may be a wired transceiver or wired signal receiver.

As shown in FIG. 3, the control circuit module 232 connects to the accessory devices 112 via a relay and fuse module 248 and a pin connector 250. More particularly, a flexible lead 252 with a sufficient length is connected to the pin connector 250 and extends therefrom to a location external of the operator cab 170 to connect to a pin connector 254 of the accessory devices 112, thereby connecting the accessory devices 112 to the control circuit module 232.

As described above, the add-on control apparatus 142 also comprises a plurality of control actuators 202 of the main frame assembly 220 (which include the control actuators 204 to 210 engaging the control elements 182 of the armrest panel 180) and a start-switch actuator 224 of the start-switch frame assembly 226 (which engages the start switch 212 and the handle portion of the operator key 214). The control circuit module 232 connects to the control actuators 202 and also connects to the start-switch actuator 224 via a flexible lead 244 with a releasable pin connection 246 connected in series therewith.

FIGS. 4A to 4D show the start-switch frame assembly 226 according to some embodiments of this disclosure. As shown, the start-switch frame assembly 226 comprises a frame 262 supporting thereon the start-switch actuator 224. The frame 262 comprises an interface 264 for engaging a supporting structure of the start switch 212.

The start-switch actuator 224 comprises a gear 266, a gear rack 268, a linearly movable base 278, and a pair of actuator components 280 and 282.

The gear 266 comprises a recess or slot 270 at the center thereof for receiving therein the handle portion of the operator key 214 (not shown), and one or more delimiting slots 272 about the edge thereof for receiving therein one or more delimiters 274 such that the rotation of the gear 266 is limited to a predefined range by the one or more delimiters 274.

The gear rack 268 is linearly moveably along a track 276 of the frame 262. The gear rack 268 engages the gear 266 to convert the linear movement of the gear rack 268 to rotatory movement of the gear 266.

The first actuator component 280 couples the gear rack 268 to the base 278. Specifically, the first actuator component 280 comprises a body 284 with the rear side thereof coupled to the base 278. The front portion of the body 284 comprises a longitudinal bore (not shown) movably receiving therein a rod 286 and a motor (not shown) electrically connected to the control circuit module 232 and engaging the rod 286. The rod 286 forwardly extends out of the longitudinal bore of the body 284 and is coupled to the gear rack 268.

The second actuator component 282 couples the base 278 to a fixed point such as an anchor point on the frame 262 of the start-switch frame assembly 226. Specifically, the second actuator component 282 comprises a body 288 with the front side thereof coupled to the base 278. The rear portion of the body 288 comprises a longitudinal bore (not shown) movably receiving therein a rod 290 and a motor (not shown) electrically connected to the control circuit module 232 and engaging the rod 290. The rod 290 rearwardly extends out of the longitudinal bore of the body 288 and is coupled to the anchor point on the frame 262 of the start-switch frame assembly 226.

Figure 5:
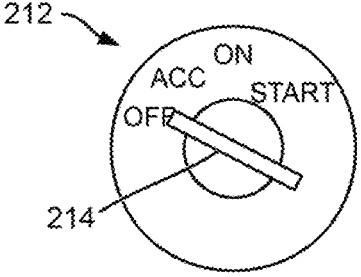
FIG. 5 is a schematic front view of a start switch of the work vehicle shown in FIG. 1.
Figure 6A:
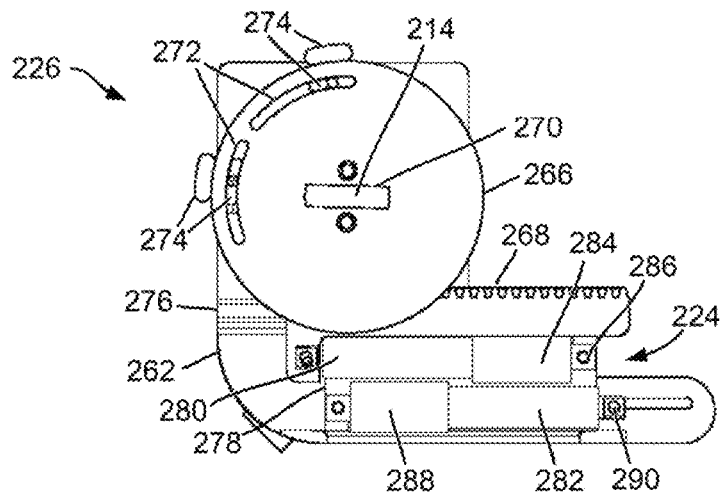
FIGS. 6A to 6C show a process of starting the engine of the work vehicle shown in FIG. 1 using the start-switch frame assembly shown in FIG. 4A.
Figure 6B:
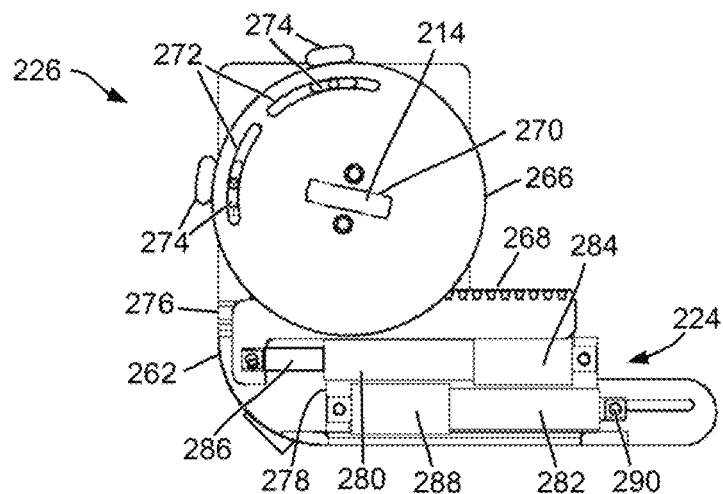
Figure 6C:
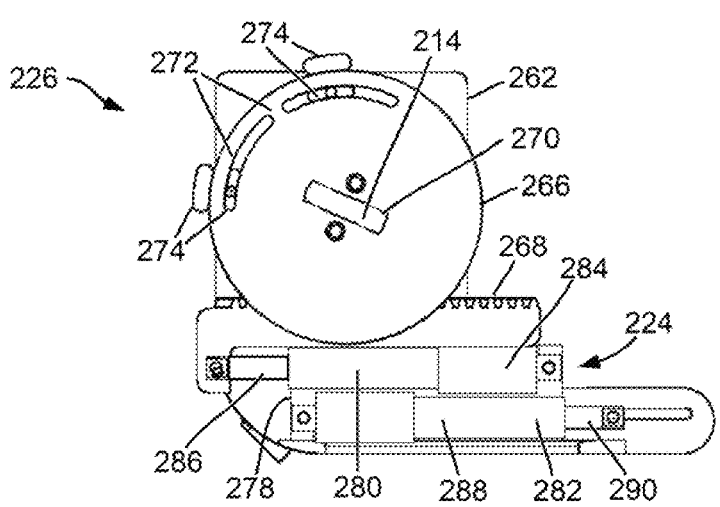

With reference to FIG. 5 which shows an example of the start switch 212. FIGS. 6A to 6C illustrate the operation of the start-switch actuator 224.

FIG. 6A shows the start-switch actuator 224 and the handle portion of the operator key 214 received in the slot 270 of the gear 266 of the start-switch actuator 224. The start-switch actuator 224 is at an inactivated state and the key 224 is at the OFF position (see FIG. 5).

As shown in FIG. 6B, when the operator uses the remote control 144 to command the control circuit module 232 to start the work vehicle 100, the control circuit module 232 activates the motor of the first actuator component 280 to actuate the rod 286 to further extend out of the bore of the body 284 of the first actuator component 280. As the rod 286 is coupled to the gear rack 268, the gear rack 268 is moved forwardly and causes the gear 266 to rotate clockwise thereby rotating the key 214 from the OFF position to the ON position.

As shown in FIG. 6C, after the key 214 is rotated to the ON position, the control circuit module 232 activates the motor of the second actuator component 282 to actuate the rod 290 to further extend out of the bore of the body 288 of the second actuator component 282. As the body 288 of the second actuator component 282 is coupled to the base 278 and the rod 290 is coupled to the frame 262 of the start-switch frame assembly 226, the start-switch actuator 224 (except the rod 290) and consequently the gear rack 268 are moved forward to further rotate the gear 266 and actuate the operator key 214 to the START position and maintain the operator key 214 at the START position for several seconds to start the engine 102, or alternatively maintain the operator key 214 at the START position as long as the START button on the remote control 144 (described in more detail later) is depressed. Then, the motor of the second actuator 282 retracts the rod 290 into the bore of the body 288 of the second actuator 282, which causes rearward movement of start-switch actuator 224 and the gear rack 268 and counterclockwise rotation of the gear 266 (see FIG. 6B), thereby rotating the operator key 214 to the ON position.

When the operator uses the remote control 144 to command the control circuit module 232 to turn off the work vehicle 100, the control circuit module 232 activates the motor of the first actuator 280 to retract the rod 286 into the bore of the body 284 of the first actuator 280. The gear rack 268 is then moved rearwardly and causes the gear 266 to rotate counterclockwise, thereby rotating the key 214 to the OFF position (see FIG. 6A).

In some embodiments, the second actuator 282 may be first activated to actuate the operator key 214 from the OFF position to the ON position and the first actuator 280 may be then activated to actuate the operator key 214 from the ON position to the START position to start the engine 102.

Figure 7A:
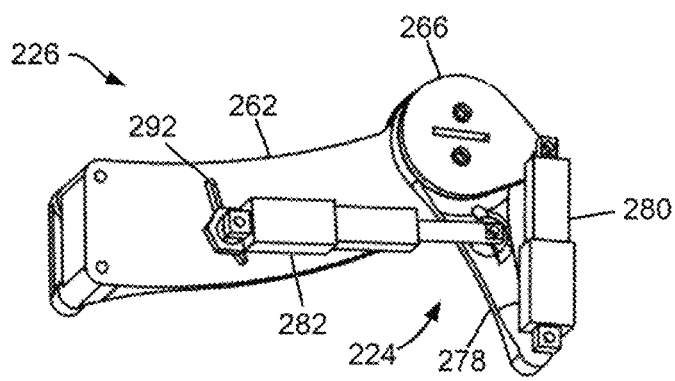
FIGS. 7A and 7B are perspective views of a start-switch frame assembly of the add-on control apparatus of the work vehicle shown in FIG. 1 from different viewing angles, according to some embodiments of this disclosure.
Figure 7B:
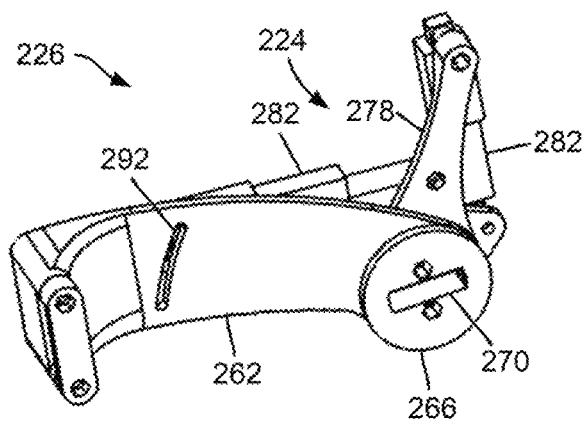

FIGS. 7A and 7B show the start-switch frame assembly 226 according to some alternative embodiments of this disclosure. The start-switch frame assembly 226 is similar to that shown in FIGS. 4A to 4D except that the start-switch frame assembly 226 in these embodiments does not comprise any gear rack and the gear 266 is replaced with a wheel (also identified using reference numeral 266) rotatably coupled to the base 278. Moreover, the second actuator 282 is coupled to the frame 262 of the start-switch frame assembly 226 and is movable in a slot 292 thereon.

To start the engine 102, the first actuator 280 is configured for rotating the wheel 266 to actuate the operator key 214

(not shown) from the OFF position to the ON position and the second actuator 282 is configured for further rotating the base 278 (and thus the wheel 266 thereon) to actuate the operator key 214 from the ON position to the START position.

Although not shown, the start-switch frame assembly 226 in these embodiments may also comprise one or more delimiters for delimiting the rotation range of the wheel 266.

In some alternative embodiments, the second actuator 280 may be configured for actuating the operator key 214 (not shown) from the OFF position to the ON position and the first actuator 282 may be configured for further actuating the operator key 214 from the ON position to the START position.

Figure 8A:
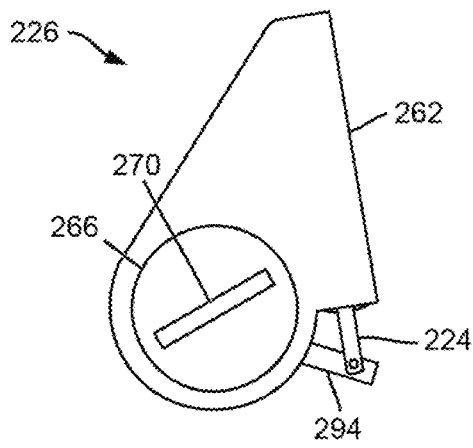
FIGS. 8A and 8B are schematic front and rear views of a start-switch frame assembly of the add-on control apparatus of the work vehicle shown in FIG. 1, according to yet some embodiments of this disclosure.
Figure 8B:
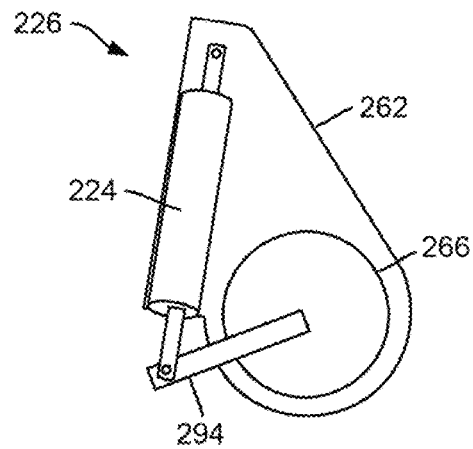

FIGS. 8A and 8B show the start-switch frame assembly 226 according to some embodiments of this disclosure. As shown, the start-switch frame assembly 226 comprises a frame 262 rotatably receiving a wheel 266 thereon. The wheel 266 comprises a recess or slot 270 for receiving therein the handle portion of the operator key 214 (not shown). An actuator 224 is coupled to the frame 262 at one end and coupled to the wheel 266 at the other, opposite end via a crank arm 294 for rotating the wheel 266 and the operator key 214 between various operating positions.

Although not shown, the start-switch frame assembly 226 in these embodiments may also comprise one or more delimiters for delimiting the rotation range of the wheel 266.

Figure 9A:
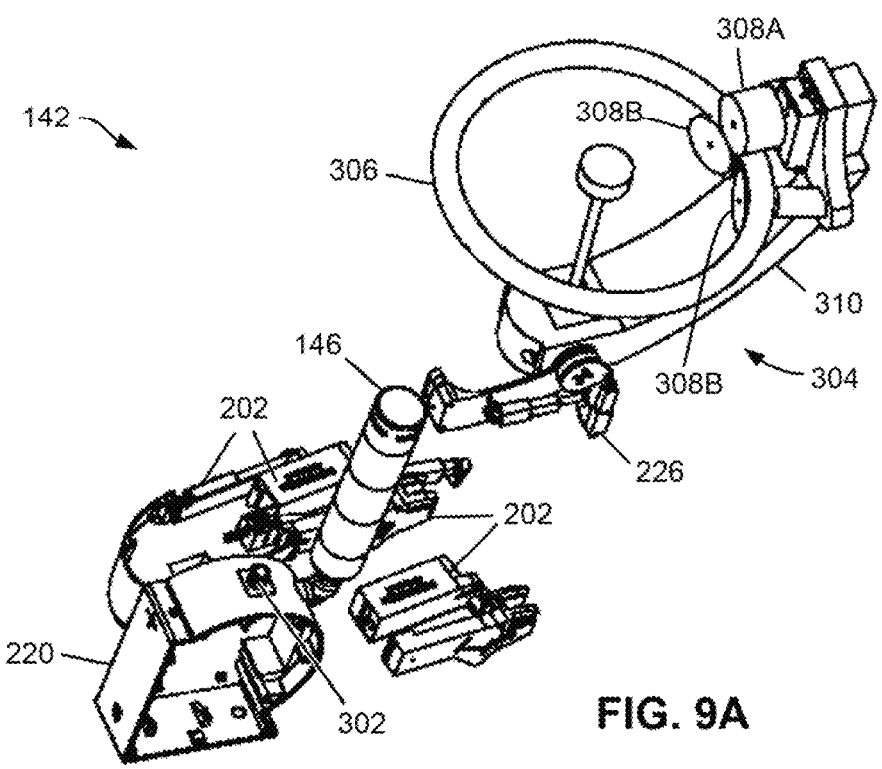
Figure 9B:
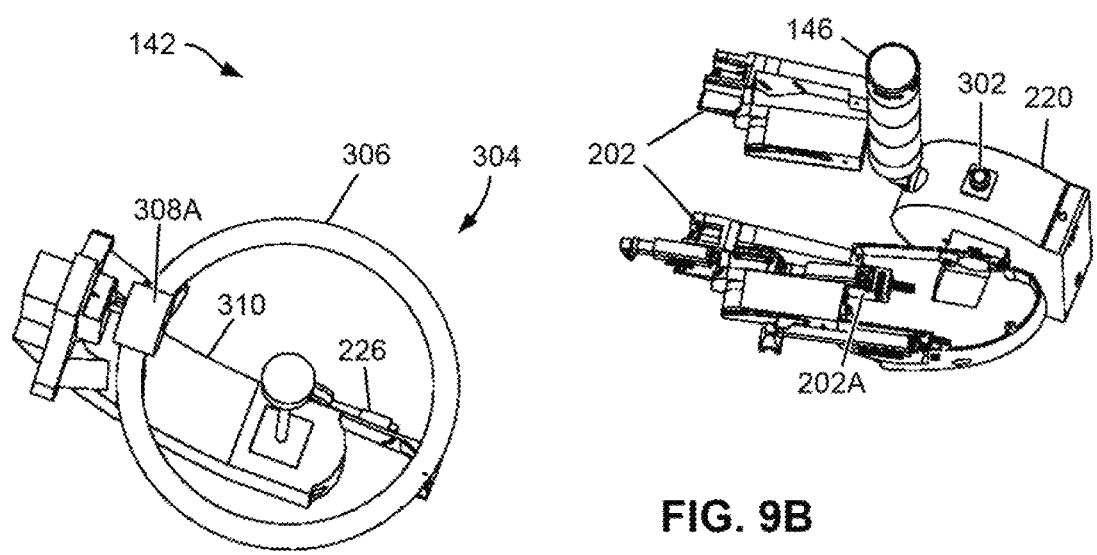

FIGS. 9A and 9B show an add-on control apparatus 142 according to some embodiments of this disclosure. As shown, the add-on control apparatus 142 comprises a frame assembly 220 receiving therein the circuits 232, 234, 248, and 256, the indicator light 146, a plurality of control actuators 202 (including the start-switch frame assembly 226) functionally connected to the control circuit module 232 for actuating the control elements 182 under the command of the control circuit module 232, and an in-cab emergency stop button 302 on the frame assembly 220 for commanding the control actuators 202 and 224 to actuate all control elements 182 to the OFF state to stop the operation of the work vehicle 100 and the implements 108 thereof.

In these embodiments, one of the control actuators 202 is a control assembly 304 for controlling the steering wheel 306 of the work vehicle 100. The control assembly 304 comprises a driving wheel 308A actuatable by a motor (not shown) under the commands of the control circuit module 232, and a plurality of driven wheels 308B rotatably coupled to a frame 310. The wheels 308A and 308B pressurize and sandwich the steering wheel 306 therebetween (for example, the driving wheel 308A above the steering wheel 306 and two driven wheels 308B therebelow) and act as the actuators 202 for actuating and rotating the steering wheel 306 for changing the moving direction of the work vehicle 100.

Other control actuators 202 may take any suitable forms as described above. In these embodiments, one or more of the control actuators 202 such as the control assembly 202A may have a structure for the operator to adjust the position thereof. The detail of the control assembly 202A is shown in FIG. 10.

Figure 10:
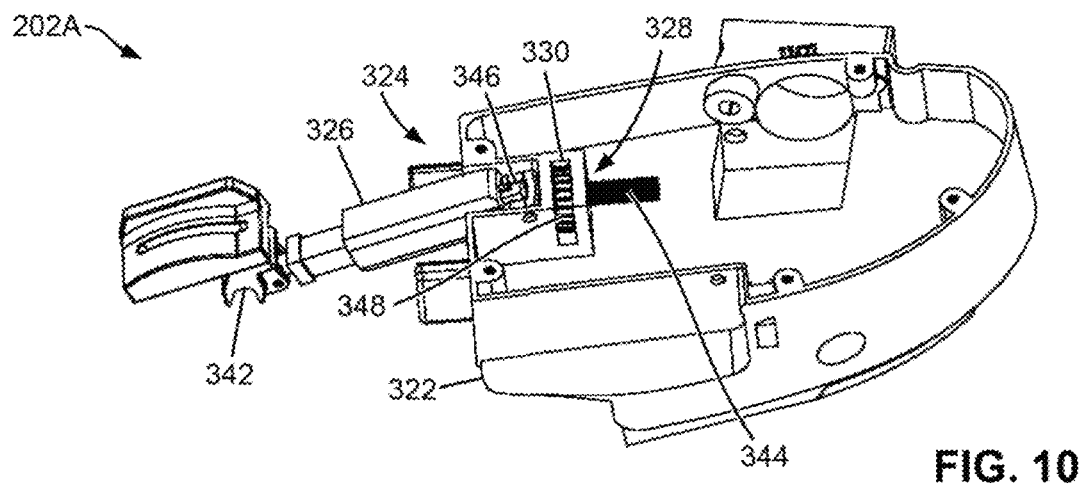
FIG. 10 is a perspective view of a portion of the add-on control apparatus shown in FIG. 9A.

As shown in FIG. 10, the control assembly 202A comprises a base 322 having an interface 324 for coupling to the actuator 326. The interface 324 comprises a longitudinal bore 328 and a laterally extending recess 330 intersecting the bore 328.

The actuator 326 comprises a control-element adapter 342 at the front end thereof for coupling to the control element (not shown). The rear end of the actuator 326 is coupled to a threaded rod 344 via a pivot 346. A dial wheel 348 having a bore and threads on the inner surface thereof is received in the recess 330. The threaded rod 344 extends through the bore 328 and the bore of the dial wheel 348 such that the threads of the threaded rod 344 engage those of the dial wheel 348. Thus, the longitudinal position of the actuator 326 may be adjusted by the operator by rotating the dial wheel 348.

Figure 11:
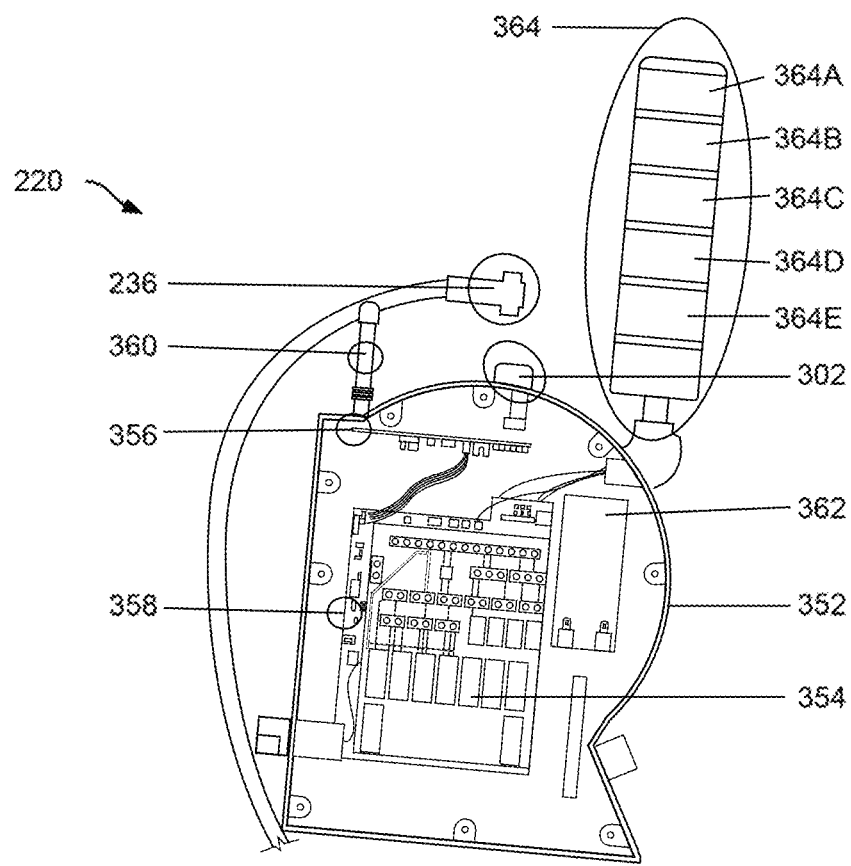
FIG. 11 is a photo showing an example of a main frame assembly of the add-on control apparatus shown in FIG. 9A.

FIG. 11 shows an example of the main frame assembly 220 of the add-on control apparatus 142. As shown, the main frame assembly 220 comprises an enclosure 352 receiving therein a main circuit board 354 implementing the control circuit module 232, a remote receiver system circuit board 356 and a wireless remote relay circuit board 358 implementing the transceiver 256 and connected to a radio communications receiver antenna 360 for communication with the remote control 144. A safety backup battery 362 is used for powering the circuit boards 354, 356 and 358. The main frame assembly 220 also comprises a power supply cord 236 for using an external power (for example, via the 12 V socket 216 (not shown), to power the circuit boards 354, 356 and 358.

The main frame assembly 220 comprises a system status light system 146 extending out of the enclosure 352 for indicating the status of the work vehicle 100. The system status light system 146 comprises a plurality of lights such as a first light 364A indicating that the remote system is engaged and ignition key is ON, a second light 364B indicating that the PTO is engaged, a third light 364C indicating that the engine RPM is engaged, a fourth light 364D indicating that the first hydraulic circuit is engaged, and a fifth light 364E indicating that the second hydraulic circuit is engage.

The main frame assembly 220 also comprises the in-cab emergency stop button 302 for commanding the one or more control actuators 202 and 224 to actuate the one or more manually operable control elements to the OFF states to stop the operation of the work vehicle 100 and the implements 108 thereof. The main frame assembly 220 further comprises an ignition key module connection port (such as a six-pin connection port) for connecting the start-switch frame assembly 226 (for example, the motors of the start-switch actuator 224 thereof), and a user accessory port (such as a four-pin connection port) for connecting the accessory device 112.

In some embodiments, the one or more add-on control apparatuses 142 may further comprise one or more speed control actuators mechanically engaging the mechanical operator-interface of one or more speed control elements of the power source 102 such as one or more RPM control elements of the engine (which may be an internal combustion engine or a motor, as described above) to "override" the manual operation thereof and enable remote control thereof from the remote-control device 144. As those skilled in the art will appreciate, the speed control elements of the engine may in various forms such as a gas paddle, a dial, a slider, a plurality of push buttons for controlling the RPM of the engine 102. Accordingly, the speed control actuators may comprise a linear actuator, a rotary actuator, a plurality of push button actuators similar to those described above for engaging the mechanical operator-interface of corresponding speed control elements.

Figure 12A:
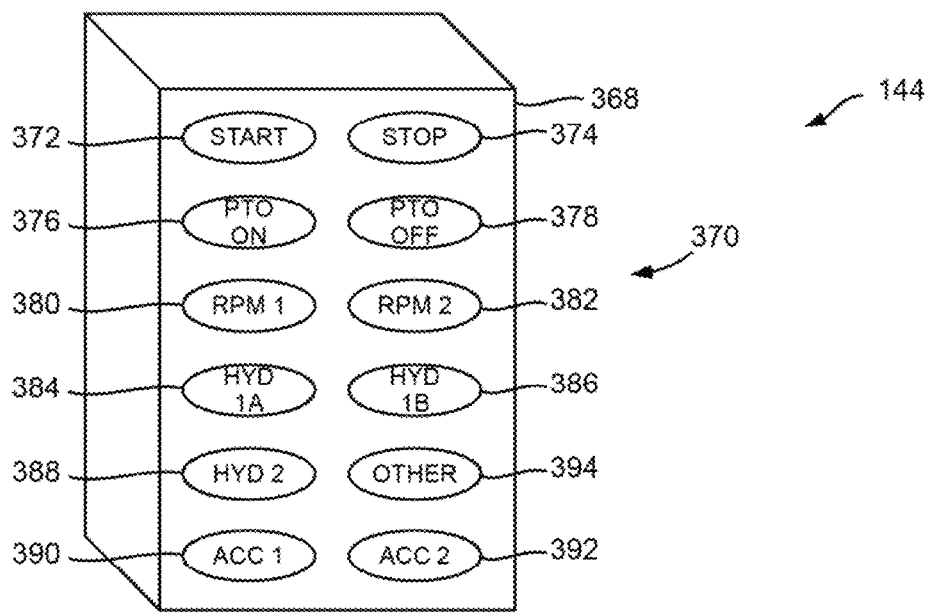
FIG. 12A is a schematic perspective view of a remote control for remotely controlling the work vehicle shown in FIG. 1.

FIG. 12A shows an example of the remote control 144. As shown, the remote control 144 comprises a housing 368 supporting a plurality of buttons 370. When a button 364 is depressed by an operator, a circuit board (not shown) of the remote control 144 transmits a corresponding command wirelessly to the transceiver 256 of the add-on control apparatus 142. In receipt of the start command signal, the control circuit module 232 then command a respective control actuator 202 to actuate the associated control element 182 to operate the work vehicle 100 or the implement 108 thereof.

In this example, the remote control 144 comprises a START button 372, a STOP button 374, a PTO ON button 376, a PTO OFF button 378, one or more RPM buttons 380 and 382, one or more hydraulic buttons 384, 386, and 388, and one or more accessory buttons 390 and 392. The remote control 144 may also comprise other buttons 394 as needed.

The START button 372 and a STOP button 374 are used for commanding the start-switch actuator 224 to actuate the start switch 212 to start and turn off the engine 102, respectively. When the START button 372 is pressed, a start command signal is generated by the remote control 144 and transmitted to the transceiver 256 of the add-on control apparatus 142. Upon receiving the start command signal from the transceiver 256, the control circuit module 232 command the start-switch actuator 224 to actuate the start switch 212 from the OFF position to the START position and hold the start switch 212 in the START position for a predefined start duration, for example a few seconds, followed by returning the start switch 212 to the ON position upon expiry of the predefined duration, thereby starting the engine 102 of the work vehicle 100.

When the STOP button 374 is pressed, a stop command signal is generated by the remote control 144 and transmitted to the transceiver 256 of the add-on control apparatus 142. Upon receiving the stop command signal from the transceiver 256, the control circuit module 232 command the start-switch actuator 224 to actuate the start switch 212 from the ON position to the OFF position to stop the engine 102 of the work vehicle 100.

In some embodiments, the remote control 144 may comprise a single START/STOP button for starting and stopping the engine 102 of the work vehicle 100. Pressing the START/STOP button when the start switch 212 is at the OFF position causes the start-switch actuator 224 to actuate the start switch 212 from the OFF position to the START position and hold the start switch 212 in the START position for a predefined start duration followed by returning the start switch 212 to the ON position upon expiry of the predefined duration, thereby starting the engine 102 of the work vehicle 100. On the other hand, pressing the START/STOP button when the start switch 212 is at the ON position causes the start-switch actuator 224 to actuate the start switch 212 from the ON position to the OFF position to stop the engine 102 of the work vehicle 100.

In some embodiments, the control circuit module 232 may be further configured to receive a timed shutoff command signal from the remote control 144. In this instance, the control circuit module 232 displaces the start switch 212 into the OFF position using the start-switch actuator 224 upon expiry of a predefined shutdown duration following receipt of the timed shutoff command signal from the remote control 144. In this instance, the work vehicle 100 is allowed to run for a period of time, for example two to five minutes, to cool down following a period of use, while the operator has left.

The remote control 144 may also comprise a timed shutoff button (not shown) to generate the timed shutoff command signal as described above.

The PTO ON button 376 and the PTO OFF button 378 are used for commanding the PTO control actuator 204 to actuate the PTO switch 184 to the ON and OFF positions to turn the PTO shaft 162 ON and OFF, respectively.

In some embodiments, the remote control 144 may comprise a single PTO button for turning the PTO shaft 162 ON and OFF. Pressing the PTO button when the PTO switch 184 is at the OFF position causes the PTO control actuator 204 to actuate the PTO switch 184 from the OFF position to the ON position to turn the PTO shaft 162 ON. On the other hand, pressing the PTO button when the PTO switch 184 is at the ON position causes the PTO control actuator 204 to actuate the PTO switch 184 from the ON position to the OFF position to turn the PTO shaft 162 OFF.

In some embodiments where the work vehicle 100 comprises separate PTO ON and PTO OFF switches, the PTO ON button 376 may be associated with the PTO ON switch for turning the PTO shaft 162 ON and the PTO OFF button 378 may be associated with the PTO OFF switch for turning the PTO shaft 162 OFF. In some embodiments wherein the remote control 144 comprises a single PTO button, the PTO button is associated with both PTO ON and PTO OFF switches for alternately actuating the PTO ON and PTO OFF switches.

The one or more RPM buttons 380 and 382 are used for commanding one or more RPM control actuators 206 to actuate the RPM control element 186 to set the RPM to specific values. In some embodiments, instead of having the RPM buttons 380 and 382, the remote control 144 may comprise a dial or slider for setting the RPM to specific values.

The one or more hydraulic buttons 384, 386, and 388 are used for commanding one or more hydraulic control actuators 208 to actuate one or more hydraulic control switches 188 towards opposing forward and reverse positions for controlling the hydraulic fluid in the respective hydraulic circuit 166 to be idle/neutral, or flow in either one of opposing forward and reverse directions, or to actuate one or more hydraulic control switches 188 to turn one or more hydraulic valves 168 of hydraulic circuits 166 on and off.

In some embodiments, two hydraulic buttons may be associated with one hydraulic circuit 166 for displacing a corresponding hydraulic valve 168 between different positions corresponding to forward and reverse actuation. In these embodiments, one hydraulic button may be associated with a corresponding hydraulic control actuator to activate a forward hydraulic control switch and the other hydraulic button may be associated with another hydraulic control actuator to activate a reverse hydraulic control switch.

Alternatively, two hydraulic buttons may cooperate with a single hydraulic control actuator that operates a single toggle type hydraulic control switch on the work vehicle 100 to displace the toggle in opposing directions using the same actuator depending upon which of the two hydraulic buttons is depressed.

In some other embodiments, a single hydraulic button may be associated with the hydraulic circuit 166 for generating a single hydraulic command signal to be received by the control circuit module 232. The control circuit module 232 alternates between actuating one or more hydraulic control actuators 208 to displace one or more hydraulic control switches 188 to set the corresponding hydraulic circuit 166 into a forward state and actuating the one or more hydraulic control actuators 208 to displace the one or more hydraulic control switches 188 to set the corresponding hydraulic circuit 166 into a reverse state.

In some embodiments, each of the hydraulic buttons 384, 386, and 388 may be a momentary button which continues to actuate the hydraulic circuit 166 in the corresponding forward or reverse state only for as long as the button is pressed, and may actuate the hydraulic circuit 166 to the neutral state when the button is no longer pressed. Both the hydraulic control switches 188 on the work vehicle 100 and the actuation of the hydraulic control actuators 208 by the control circuit module 232 may be programmed as momentary actuating buttons in these embodiments.

Alternatively, the hydraulic control switches 188 on the work vehicle 100 may be programmed to function as latching switches such that a momentary actuation of the hydraulic control switch 188 causes latching of the hydraulic valve 168 to remain in the forward state or reverse state until the corresponding hydraulic control actuator 208 reaches the end of travel, or until the hydraulic valve 168 has been latched in the corresponding forward or reverse state for a predefined duration dictated by the programming of the work vehicle 100. In these embodiments, a momentary actuation of the hydraulic buttons 384, 386, and 388 on the remote control 144 results in the control circuit module 232 commanding the hydraulic control actuators 208 to actuate momentarily, but the resulting actuation of the hydraulic valve 168 is latched for a predefined duration.

In some embodiments, the hydraulic control switches 188 on the work vehicle 100 may be momentary buttons which only actuate the corresponding hydraulic circuit 166 in a forward or reverse orientation as long as the hydraulic control switch 188 remains depressed. In these embodiments, the control circuit module 232 may be programmed to latch actuation of the corresponding hydraulic switch actuator 208 for a predefined duration in response to a momentary hydraulic command signal from the remote control 144 resulting from a momentary actuation of the corresponding hydraulic button 384, 386, or 388.

The remote control 144 also includes one or more accessory buttons 390 and 392 for generating accessory command signals received by the control circuit module 232 to control the accessory device 112. Similar to the description above, a pair of accessory buttons 390 and 392 may be associated with the accessory device 112 with one accessory button 390 for turning the accessory device 112 on and the other accessory button 392 for turning the accessory device 112 off. Alternatively, a single accessory button may be associated with the accessory device 112 for turning the accessory device 112 on and off.

The remote control 144 may further comprise one or more other buttons 394 for remotely operating other elements or implements of the work vehicle 100.

Figure 12B:
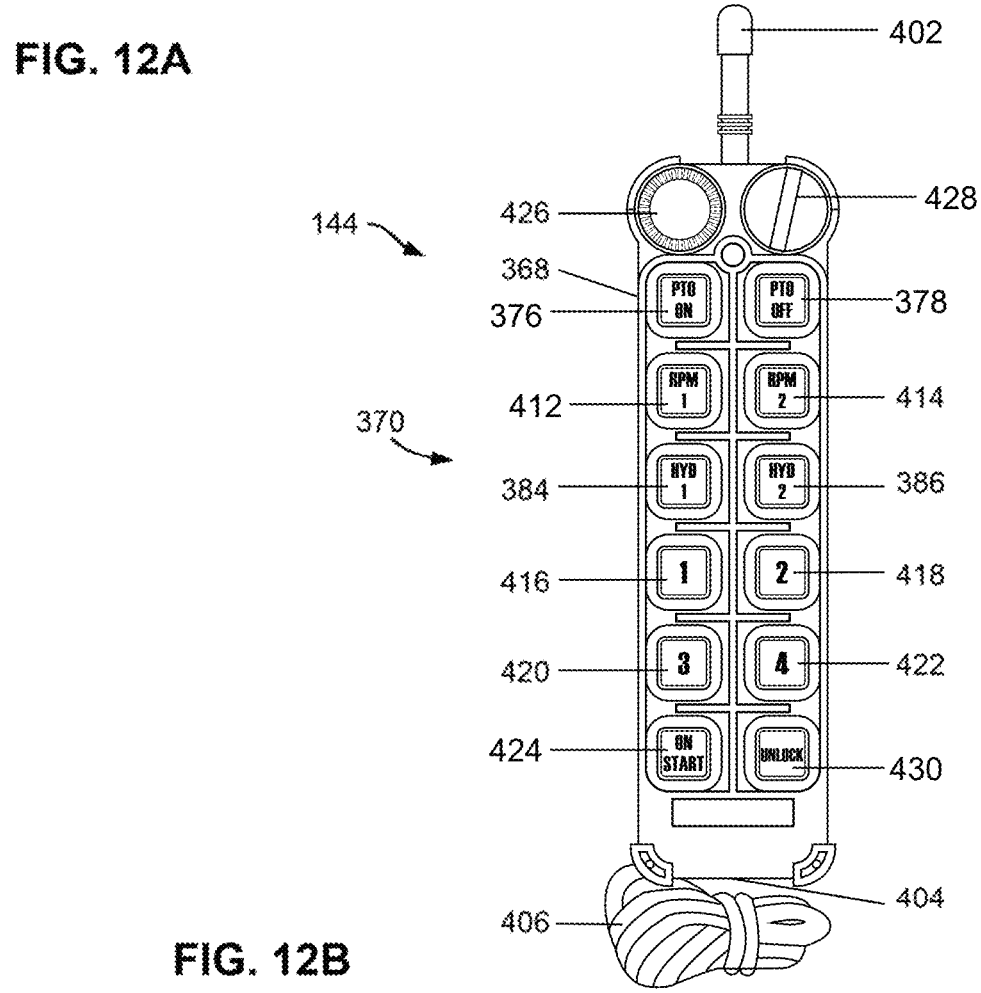
FIG. 12B is a photo showing an example of a remote control for remotely controlling the work vehicle shown in FIG. 1.

FIG. 12B shows another example of the remote control 144. As shown, the remote control 144 comprises a housing 368 having a plurality of buttons 370, an antenna 402, and a battery compartment 404. A safety lanyard 406 is attached to the housing 368.

Similar to the remote control described above, when a button 364 is depressed by an operator, a circuit board (not shown) of the remote control 144 transmits a corresponding command wirelessly via the antenna 402 to the transceiver 256 of the add-on control apparatus 142. In receipt of the start command signal, the control circuit module 232 then command a respective control actuator 202 to actuate the associated control element 182 to operate the work vehicle 100 or the implement 108 thereof.

In this example, the plurality of buttons 370 of the remote control 144 include a PTO ON button 376, a PTO OFF button 378 (similar to those shown in FIG. 12A), a pair of engine RPM buttons 412 and 414 for controlling the rotary speed of the engine 102, a pair of hydraulic buttons 384, 386 (similar to those shown in FIG. 12A), and four accessary buttons 416 to 422 for controlling the accessory device 112.

The remote control 144 also comprises an engine button 424. When the start switch 212 of the work vehicle 100 is at the OFF position and the engine button 424 is depressed, the remote control 144 transmits a signal to the control circuit module 232 to command the start-switch actuator 224 to actuate the start switch 212 to the ON position. Then, the operator may depress the engine button 424 and maintain the engine button 424 at the depressed state for a period of time. The remote control 144 then transmits another signal to the control circuit module 232 to command the start-switch actuator 224 to actuate the start switch 212 to the START position and maintain the start switch 212 at the START position until the operator releases the engine button 424. A next depress of the engine button 424 triggers the remote control 144 to transmit a third signal to the control circuit module 232 to command the start-switch actuator 224 to actuate the start switch 212 to the OFF position to stop the operation of the work vehicle 100.

For safety considerations, the remote control 144 in these embodiments comprises a remote emergency stop button 426, a remote security key 428, and an unlock button 430. Similar to the in-cab emergency stop button 302, the remote emergency stop button 426 is used for commanding the one or more control actuators 202 and 224 to actuate the one or more manually operable control elements to the OFF states to stop the operation of the work vehicle 100 and the implements 108 thereof.

The remote security key 428 comprises a security key 428 removably inserted into a key slot (not shown) for enabling the functions of the remote control 144. When the security key 428 is removed from the key slot, the remote control 144 is disable.

The unlock button 430 is for "unlocking" or enabling one or more "special" buttons of the remote control 144 and preventing accidental operations thereof. More specifically, after the unlock button 430 is depressed, the one or more special buttons are enabled for a predefined period of time or until any of the one or more special buttons is depressed. Therefore, every time when the operator needs to operate a special button, the operator has to depressed the unlock button 430 first and then depress the desired special button with the predefined period of time.

For example, the unlock button 430 in some embodiments is a PTO/engine starter safety unlock button 430 for unlocking the engine button 424 and the PTO ON button 376 and preventing accidental start of the engine 102 and PTO shaft 162. For example, the operator needs to first depress the PTO/engine starter safety unlock button 428 and then depress the engine button 424 as described above to start the engine 102. The operator also needs to first depress the PTO/engine starter safety unlock button 428 and then depress the PTO ON button 376 to turn on the PTO shaft 162.

In some embodiments, the one or more special buttons are enabled when the unlock button 430 is depressed and are disabled when the unlock button 430 is released. Therefore, the operator needs to depressed and hold the unlock button 430 and then depress a desired special button while the unlock button 430 is depressed to use the desired special button to trigger corresponding operation of the work vehicle 100.

With the add-on control apparatuses 142 disclosed herein, one may readily convert a work vehicle 100 to a remote controllable vehicle without modifying the electrical and/or hydraulic circuits thereof. The modification to the work vehicle 100 may be minimal and may only involve mounting various components of the add-on control apparatuses 142 to suitable locations of the work vehicle 100 using suitable fastening means such as screws, nails, glue, straps, quick-release pins, and/or the like, and then engaging the control actuators 202 with respective manually operable control elements 182. The control actuators 202 act/mimic human fingers/hands to gain/allow movement of manually operable control elements 182.

In some embodiments, the add-on control apparatuses 142 may be customized to fit different brands and/or models of the work vehicle 100. Moreover, the add-on control apparatuses 142 in some embodiments may be modularized such that different control actuator assemblies 202 may be detachably attached to the main frame assembly 220 and functionally connected to the control circuit module 232 to adapt to different brands and/or models of the work vehicle 100.

In operation, the operator may stay outside the operator cab of the work vehicle 100 (for example, in proximity to the implements 108) and use the remote control 144 to start the engine 102 of the work vehicle 100, followed by actuating the control elements 182 as needed to operate corresponding functions of the work vehicle 100 and the implements 108 thereof. The statuses of the engine 102 and the control elements 182, such as wireless remote system on/off, engine on/off, engine RPM high/low, PTO on/off, hydraulic valve 1 on/off, and hydraulic valve 2 on/off, may be indicated by the indicator light 146 in suitable manners, such as using different colors or different pulse patterns, so that the statuses are visible to the operator external of the operator cab.

In above embodiments, the actuators are linear actuators similar to those shown in FIGS. 4A to 4D. Each actuator comprises a motor functionally connected to the controlling circuit module 232 for driving the actuator under the commands of the controlling circuit module 232. Those skilled in the art will appreciate that, in other embodiments, the actuators may be other suitable types such as rotary actuators and/or the like.

Figure 13:
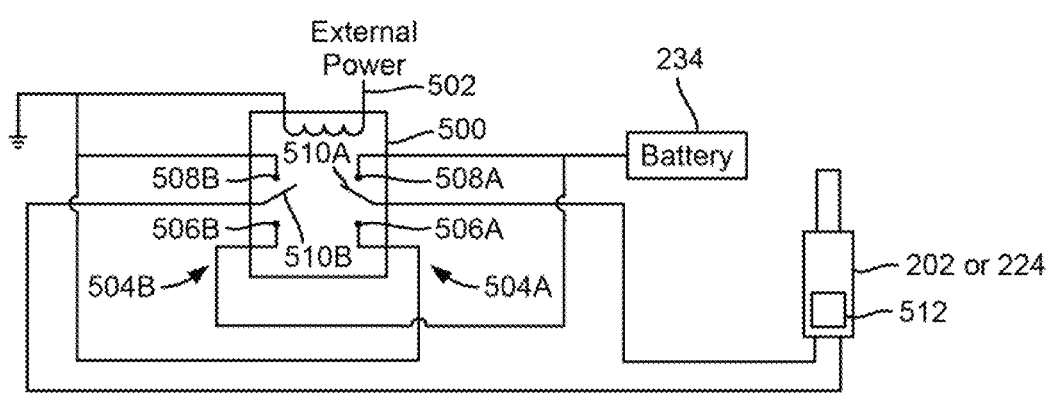
FIG. 13 shows a circuit connected to a control actuator of the add-on control apparatus shown in FIG. 9A, according to some embodiments of this disclosure.

In some embodiments, each of the control actuators 202 and 224 is coupled to a corresponding motor controlled by a corresponding relay for implementing the above-described emergency stop function. FIG. 13 shows an example.

As shown, the relay 500 comprises a coil 502 and two switches 504A and 504B (collectively identified using reference numeral 504). Each switch 504 comprises a first terminal 506, a second terminal 508, and a throw 510 wherein the throw 510 is switchable between the first and second terminals 506 and 508, and is by default (that is, when the coil 502 is de-energized) connected to the first terminal 504.

The coil 502 is connected to the common ground at one end and connected to the external power via the control circuit module 232 (not shown). The battery 234 connects the common ground to the first terminal 506B of the second switch 504B and also to the second terminal 508A of the first switch 504A. The first terminal 508A of the first switch 504A and the second terminal 508B of the second switch 504B are connected to the common ground. The throws 510A and 510B of the first and second switches 504A and 504B are connected to the direct-current (DC) motor 512 of the control actuator 202 or 224.

In operation, the control circuit module 232 may connect or disconnect the coil 502 to the external power. When the coil 502 is connected to the external power, the coil 502 is energized and causes the throws 510A and 510B to connect the second terminals 508A and 508B, respectively, thereby powering the DC motor 512 of the control actuator 202 or 224 to actuate the corresponding control element (not shown). When the coil 502 is disconnected from the external power, the coil 502 is de-energized and causes the throws 510A and 510B to return to their default position, that is, connecting to the first terminals 508A and 508B, respectively, thereby reversing the current of the DC motor 512 of the control actuator 202 or 224 and causing the actuated control element to return to its default OFF position.

In the event of a loss of external power to the control circuit module 232 from the work vehicle 100, the coil 502 is de-energized and causes the throws 510A and 510B to return to their default position, that is, connecting to the first terminals 508A and 508B, respectively, thereby reversing the current of the DC motor 512 of the control actuator 202 or 224 and causing the actuated control element to return to its default OFF position.

In some embodiments, one or more of the control actuators 202 and 224 may comprise an actuator delimiter adjustable by the operator to adjust the actuation range. For example, a control actuator 202 comprises a delimiting extrusion movable with the actuation of the control actuator 202, and a range-limiting switch. The position of at least one of the delimiting extrusion and the range-limiting switch is adjustable by the operator. In operation when the actuator 202 is actuating, the delimiting extrusion is moved with the actuation. When the delimiting extrusion is in contact with and presses the range-limiting switch, the range-limiting switch then disconnects the motor of the actuator 202 and stops the actuation thereof.

Although a work vehicle is described in above embodiments, those skilled in the art will appreciate that the vehicle 100 in other embodiments may be any suitable vehicle.

Although embodiments have been described above with reference to the accompanying drawings, those of skill in the art will appreciate that variations and modifications may be made without departing from the scope thereof as defined by the appended claims.

What is claimed is:

1. An add-on control apparatus for remotely controlling at least one manually operable mechanical operator-interface control element within an operator cab of a vehicle, wherein the at least one mechanical operator-interface control element includes:
  a power take off (PTO) control element on a console within the operator cab of the vehicle for engaging and disengaging the PTO of the vehicle;
  an engine speed control element on the console within the cab of the vehicle for increasing and decreasing the revolutions per minute (RPM) speed of an engine of the vehicle; and
  an operator key received within a manual start switch within the operator cab of the vehicle for starting the engine of the vehicle, the manual start switch having an off position, an on position and a start position; and
the add-on control apparatus comprising:
  a frame configured to releasably couple to the console within the operator cab of the vehicle;
  at least one control actuator configured to mechanically engage with a corresponding one of the at least one mechanical operator-interface control element;
  a remote control device configured to output command signals, the remote control device being remote from the vehicle;
  a signal receiver for receiving command signals from the remote control device; and
  a control circuit module functionally coupled to the signal receiver and the at least one control actuator for controlling actuation of the at least one control actuator based on the received command signals;
wherein the at least one control actuator includes a RPM control actuator having one end supported by the frame and the other end mechanically engaged with the engine speed control element, and wherein actuation of the RPM control actuator via the remote control device varies the RPM speed of the engine of the vehicle; and
(i) the at least one control actuator further including a PTO control actuator having one end supported by the frame and the other end mechanically engaged with the PTO control element, and wherein actuation of the PTO control actuator via the remote control device engages and/or disengages the PTO of the vehicle; or
(ii) a start switch assembly comprising:
a start switch frame having a start switch interface for engaging a supporting structure of the start switch;
a wheel having a slot in which the operator key is received, the wheel rotatably supported on the start switch frame; and
wherein the at least one control actuator is a start switch actuator configured to rotate the wheel, and thus the operator key received within the slot, between the off position, the on position and the start position.

2. The add-on control apparatus of claim 1 further comprising:
a signaling component for indicating an operation status of the vehicle.

3. The add-on control apparatus of claim 2, wherein the signaling component includes an indicator light visible from a position outside of the operator cab of the vehicle.

4. The add-on control apparatus of claim 1, wherein the at least one mechanical operator-interface control element further includes:
a hydraulic control element on the console within the operator cab of the vehicle, the hydraulic control element configured to control operation of a hydraulic circuit connected with the vehicle; and
wherein the at least one hydraulic control actuator having one end supported by the frame and the other end mechanically engaged with the hydraulic control element, and wherein actuation of the hydraulic control actuator via the remote control device actuates the hydraulic control element.

5. The add-on control apparatus of claim 1, wherein the at least one start switch actuator is coupled to the wheel via a crank arm.

6. The add-on control apparatus of claim 1, wherein the at least one start switch actuator includes:
a first actuator configured to rotate the wheel in a first direction of rotation to rotate the operator key received within the slot from the off position to the on position; and a second actuator configured to rotate the wheel in the first direction of rotation to rotate the operator key received within the slot from the on position to the start position.

7. The add-on control apparatus of claim 1, wherein the start switch actuator further includes a delimiter to delimit a rotation range of the wheel.

8. The add-on control apparatus of any one of claim 1, wherein the at least one mechanical operator-interface further includes:
a steering wheel within the operator cab of the vehicle, the steering wheel controlling steering of the vehicle when the vehicle is moving;
wherein the at least one control actuator is a steering wheel control actuator for engaging the steering wheel of the vehicle, and wherein actuation of the steering wheel control actuator via the remote control device controls steering of the vehicle when the vehicle is moving.

9. The add-on control apparatus of claim 8, wherein the steering-wheel control actuator includes a driving wheel and one or more driven wheels configured for engaging and sandwiching the steering wheel between the driving wheel and the one or more driven wheels.

10. The control apparatus of claim 1, further comprising:
a power source for powering the at least one control actuator, the signal receiver and the control circuit module, the power source being any of:
a power adapter plug insertable into a power socket of the vehicle and a battery module.

11. The control apparatus of claim 10, wherein the battery module is configured for powering a subset of the at least one control actuator only when the power adapter plug fails to output power; and
wherein the control circuit module is configured for commanding the at least one control actuator to stop the operation of the vehicle when the battery module is powering the second subset.

12. The add-on control apparatus of any one of claim 1, wherein the at least one mechanical operator-interface further includes:
a joystick on the console within the operator cab of the vehicle, the joystick controlling movement of the vehicle; and
wherein the at least one control actuator is a joystick control actuator having one end supported by the frame and the other end mechanically engaged with the joystick, and wherein actuation of the joystick control actuator via the remote control device controls movement of the vehicle.

* * * * *